A. J. MARESCH.
TRACTOR.
APPLICATION FILED MAR. 9, 1917.
1,268,034.
Patented May 28, 1918.
3 SHEETS—SHEET 2.
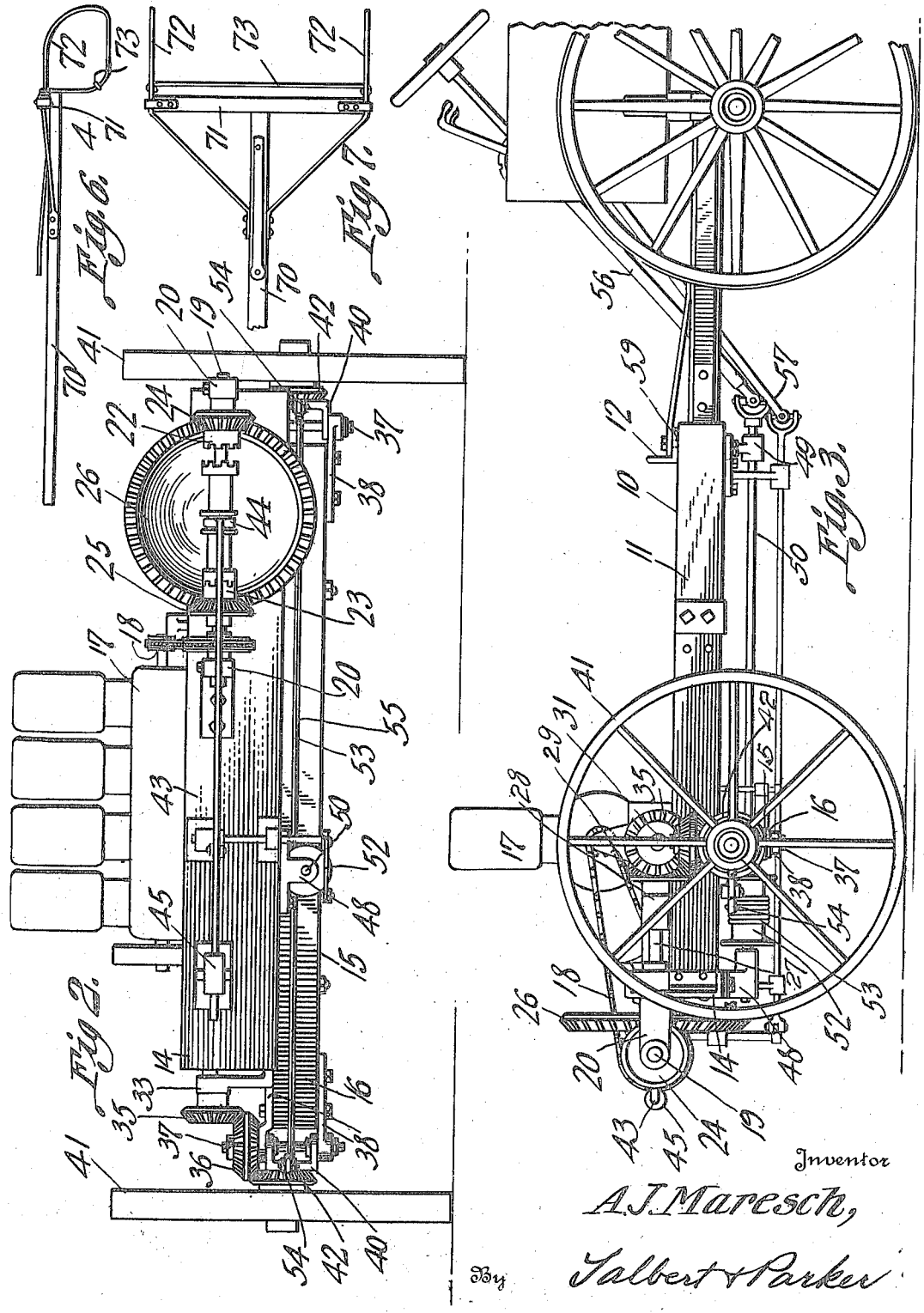
Inventor
A. J. Maresch,
By Talbert & Parker
Attorneys

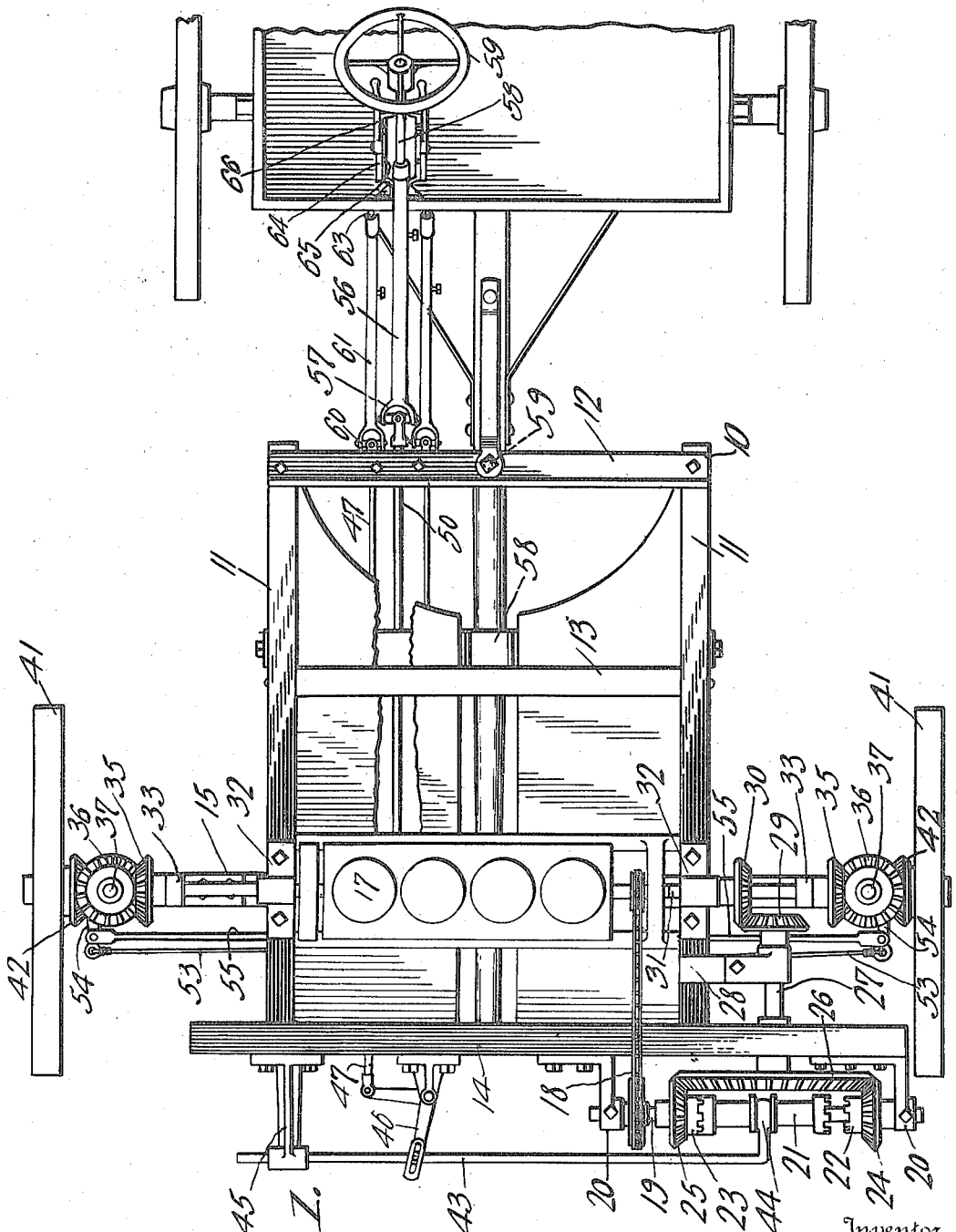

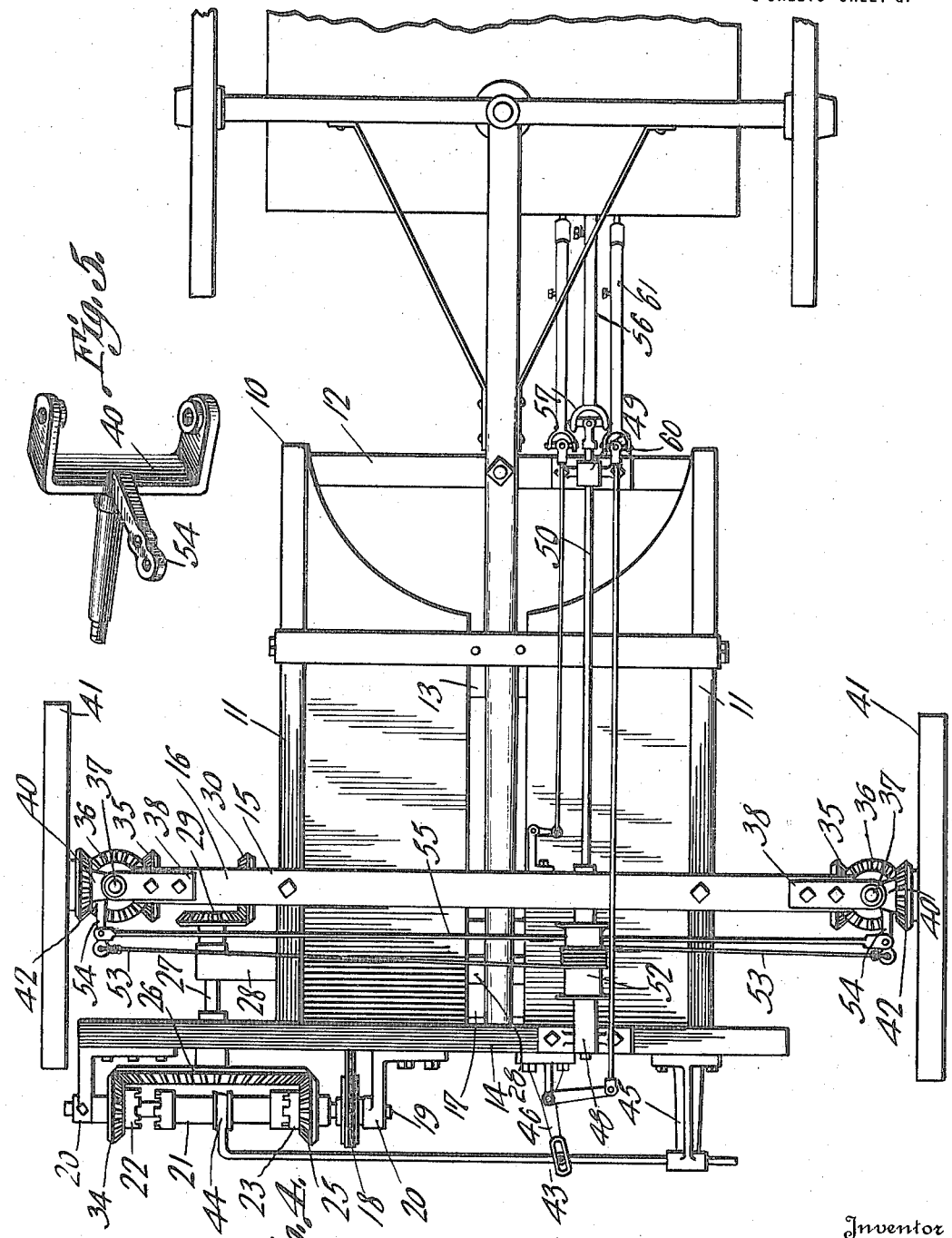

UNITED STATES PATENT OFFICE.

AUGUST J. MARESCH, OF FAITHORN JUNCTION, MICHIGAN, ASSIGNOR OF ONE-HALF TO KADING & KADING, OF WATERTOWN, WISCONSIN, A FIRM COMPOSED OF CHARLES A. KADING AND ELIZABETH KADING.

TRACTOR.

1,268,034.      Specification of Letters Patent.      Patented May 28, 1918.

Application filed March 9, 1917. Serial No. 153,683.

*To all whom it may concern:*

Be it known that I, AUGUST J. MARESCH, a citizen of the United States, residing at Faithorn Junction, in the county of Menominee and State of Michigan, have invented certain useful Improvements in Tractors, of which the following is a specification, reference being had therein to the accompanying drawing.

This invention relates to improvements in tractors, one object of the invention being the provision of a two wheeled or sulky tractor adapted to be connected to the draft appliance of a wagon, mowing machine, binder, gang plow, or other implement, and to be operated by an explosion engine carried by the tractor so that such object may be pulled.

A further object of this invention is the provision of a tractor, the wheels of which are steering wheels and which are operably connected through a novel transmission mechanism so that the operator seated upon the vehicle being hauled may control the tractor, both as to the direction of movement and also the speed of the engine.

A still further object of the invention is the provision of a device of this character which is readily placed in operative connection with the object being drawn, and which is thoroughly efficient and practical in use.

In the accompanying drawings:—

Figure 1 is a top plan view of the complete tractor, illustrating the manner of connecting a wagon tongue connected thereto.

Fig. 2 is a front elevation thereof.

Fig. 3 is a side elevation thereof.

Fig. 4 is a bottom plan view thereof.

Figs. 5, 6 and 7 are detail views of various parts.

Referring to the drawings, the numeral 10 designates the frame of the tractor which consists essentially of the two parallel beams 11 having the cross braces 12, 13 and 14 respectively and the bed brace 15 to which is attached the fixed axle member 16.

The explosion engine 17 is mounted as illustrated, and is operably connected through the chain or other transmission means 18 to the shaft 19 journaled in the brackets 20 connected to the cross bar 14.

Splined upon the shaft 19 is the slidable clutch member 21 which is adapted to connect with either one of the freely rotatable clutch members 22 and 23, each one of which is provided with its respective gear 24 and 25, so that the large gear 26 journaled upon the shaft 27 may be rotated in the desired direction.

This shaft is journaled in the beam 14 and also in the beam 28, and carries upon its inner free end the pinion 29 which meshes at all times with the pinion 30 fast upon the driven shaft 31.

This driven shaft is journaled in the bars 32 carried by the beams 11 and in the brackets 33 attached to the fixed axle 16, there being connected to the extreme ends thereof the beveled pinions 35 which in turn mesh with the double pinions 36 which in turn are journaled upon the upper ends of the respective vertical pins or shafts 37.

These pins or shafts together with the members 38, connected to the fixed axle 16, and the stub axle 40 form knuckle joints on which are journaled thereon the tractor wheels 41.

Each tractor wheel is provided with the fixed pinion 42 which is engaged by the lower portion of the respective double pinions so that power is transmitted to both of the tractor wheels simultaneously.

In order that the sliding clutch member may be controlled selectively, an L-shaped arm 43 has its end 44 connected to the sliding clutch member, while the opposite end is guided through the bracket 45 and is operably connected to the bellcrank lever 46 journaled in one end of the beam 14, a rod 47 being connected thereto for manipulating the clutch.

In order that the wheels may be swung to steer the present tractor, there is journaled in the under side of the fixed axle 16 and in the brackets 48 and 49, the shaft 50 which has fast thereto the windlass 52, upon which is wound the cable 53, whose respective ends are connected to the brackets or arms 54 connected to the respective stub axles, a connecting rod 55 also being connected to these arms to insure the proper parallel alinement of the wheels. The handle controlled steering wheel staff 56 is connected by a swivel joint 57 to the shaft 50.

Connected to the bed base of the frame is a yoke 58 which is adapted to receive the tongue of a vehicle, said tongue being extended forwardly over the fixed axle 16 to the beam 14, so that a king bolt or other coupling pin may be inserted through the opening 59 of the cross bar 12, and thus operably connect the object to be drawn to the present tractor.

It is of course to be understood that the motor 17 is centrally located with respect to the tractor so as to assure the proper balance to the machine, the staff 56 being of hollow construction and adjustably receiving therein the stem 58 of the steering wheel 59, the staff being fitted with a set screw for engagement with the stem 58 to lock the same in an adjusted position while the rod 47 has a knuckle joint connection 60 with a hollow staff 61 and in this hollow staff is adjustably engaged a rod 62 which is held in place by a set screw 63 threaded in the staff 61, the latter being disposed close to the staff 56, and the rod 62 is pivotally connected to a throw-lever 64 swingingly connected to the stem 58 of the steering wheel 59, the stem being designed to support a toothed segment 65 with which engages the hand release spring-held latch 66 carried by the throw-lever 64 and in this manner the said throw-lever is in convenient reach of the operator of the machine and also the steering wheel 59 can be readily adjusted to suit the fancy of the operator.

In this way, the present device may be readily connected so that the operator seated upon the object being drawn may control the engine and also the steering of the present tractor.

In order to provide a means for supporting the present device in a horizontal plane when not connected to a vehicle, a tongue 70 provided with the cross bar 71 and the runners 72 which are connected in said bar and to the tongue and held spaced by means of the retaining rod 73, is provided.

What I claim as new is:

1. A tractor comprising a frame composed of two parallel beams, cross braces attaching the beams together, there being a cross brace at each end of the beams, a fixed axle on which the frame is mounted, traction wheels, stub axles on which the traction wheels are journaled, the stub axles having knuckle joint connections with the fixed axle, an engine mounted on the frame above the fixed axle, connection between the engine and the traction wheels, a selective clutch mechanism included in said connection, a steering means for the traction wheels, a yoke mounted upon the frame and adapted to receive the tongue of a vehicle, the cross brace on the rear end of the frame being adapted to rest on top of the vehicle tongue and being provided with a hole, so that a draw bolt may be inserted through the hole and through the vehicle tongue, whereby the vehicle may be drawn.

2. A tractor comprising a frame composed of parallel beams and cross braces connecting the beams together, a cross brace obtaining at either end of the frame, a fixed axle mounted near the forward end of the frame, traction wheels, means for connecting the traction wheels to the axle so that they may be maintained in parallel relation and yet move angularly in respect to the axle, an engine mounted on the frame above the axle, connections between the engine and the traction wheels, selective controlling means for said connections, means for moving the traction wheels angularly with respect to the axle, and a yoke carried by the frame between the fixed axle and the rear end thereof, the yoke being adapted to receive the tongue of a vehicle, the cross brace at the rear end of the frame being provided with a hole, so that a draw bolt may be inserted therethrough and through the vehicle tongue, the said cross brace being adapted to rest on top of the tongue, whereby the tractor may be attached to a vehicle and the tractor frame maintained in a horizontal position during such attachment.

In testimony whereof I affix my signature.

AUGUST J. MARESCH.